United States Patent [19]
Reid, Jr.

[11] 4,098,519
[45] Jul. 4, 1978

[54] WHEELED SLED

[76] Inventor: Thomas J. Reid, Jr., 506 Morley Pl., Elmira, N.Y. 14904

[21] Appl. No.: 816,224

[22] Filed: Jul. 18, 1977

[51] Int. Cl.² .............................................. B62B 7/00
[52] U.S. Cl. .................................. 280/87.01; 280/102
[58] Field of Search .................. 280/87.01, 87.02 R, 280/91, 97, 100, 102

[56] References Cited

U.S. PATENT DOCUMENTS

| | | | |
|---|---|---|---|
| 1,390,567 | 9/1921 | Krieger | 280/87.01 |
| 1,408,616 | 3/1922 | Loiselle | 280/87.01 |
| 1,625,421 | 4/1927 | Pearl | 280/87.01 X |
| 1,806,749 | 5/1931 | Ellis | 280/87.01 |

Primary Examiner—Joseph F. Peters, Jr.
Assistant Examiner—R. Schrecengost
Attorney, Agent, or Firm—Seidel, Gonda & Goldhammer

[57] ABSTRACT

A wheeled sled is provided with crossed steering bars pivoted to each of the rear axle brace, front axle brace and steering handle. The steering bars pivot the axle braces in opposite directions as the steering handle is moved to minimize the turning circle. Longitudinally extending coil springs bias the steering handle to a neutral position. Handle grip brakes are provided on the steering handle for braking the front wheels.

10 Claims, 3 Drawing Figures

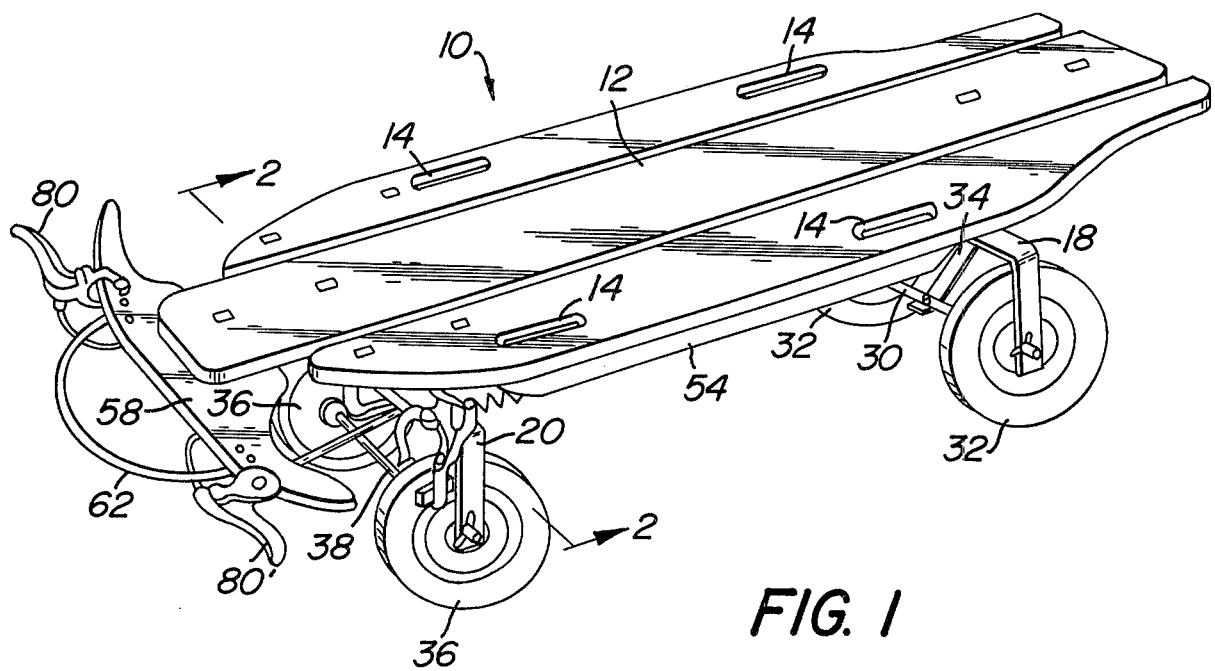
FIG. 1
FIG. 2
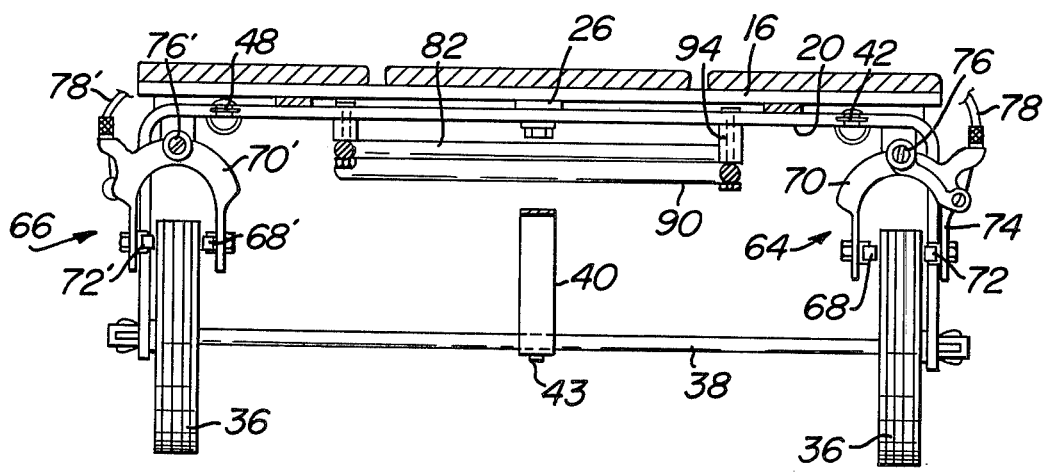

WHEELED SLED

SUMMARY OF THE INVENTION

The wheeled sled of the present invention includes a platform having front and rear ends. Front and rear axle braces are pivoted to the bottom surface of the platform between said ends. An axle is supported by each axle brace. A pair of wheels are provided on each axle. A steering handle is pivotably connected to the platform adjacent the front end thereof. Crossed steering bars are pivoted coupled to each of the axle braces and the steering handle.

In a preferred embodiment, the front wheels are provided with brakes selectively operable by way of a handle grip supported on the steering handle. The platform is preferably provided with slots to facilitate gripping the wheeled sled. The steering handle is preferably biased to a neutral position by longitudinally coil springs coupled at their ends to the front and rear axle braces.

It is an object of the present invention to provide a wheeled sled wherein a steering handle is directly coupled to axle braces for positive direct control of the axle braces for minimizing a turning circle while having a steering handle biased to a neutral position.

Other objects and advantages of the present invention will be set forth hereinafter.

For the purpose of illustrating the invention, there is shown in the drawings a form which is presently preferred; it being understood, however, that this invention is not limited to the precise arrangements and instrumentalities shown.

FIG. 1 is a perspective view of a wheeled sled in accordance with the present invention.

FIG. 2 is a sectional view taken along the line 2—2 in FIG. 1.

Referring to the drawings in detail, wherein like numerals indicate like elements, there is shown in FIG. 1 a wheeled sled in accordance with the present invention designated generally as 10.

Figure 3:
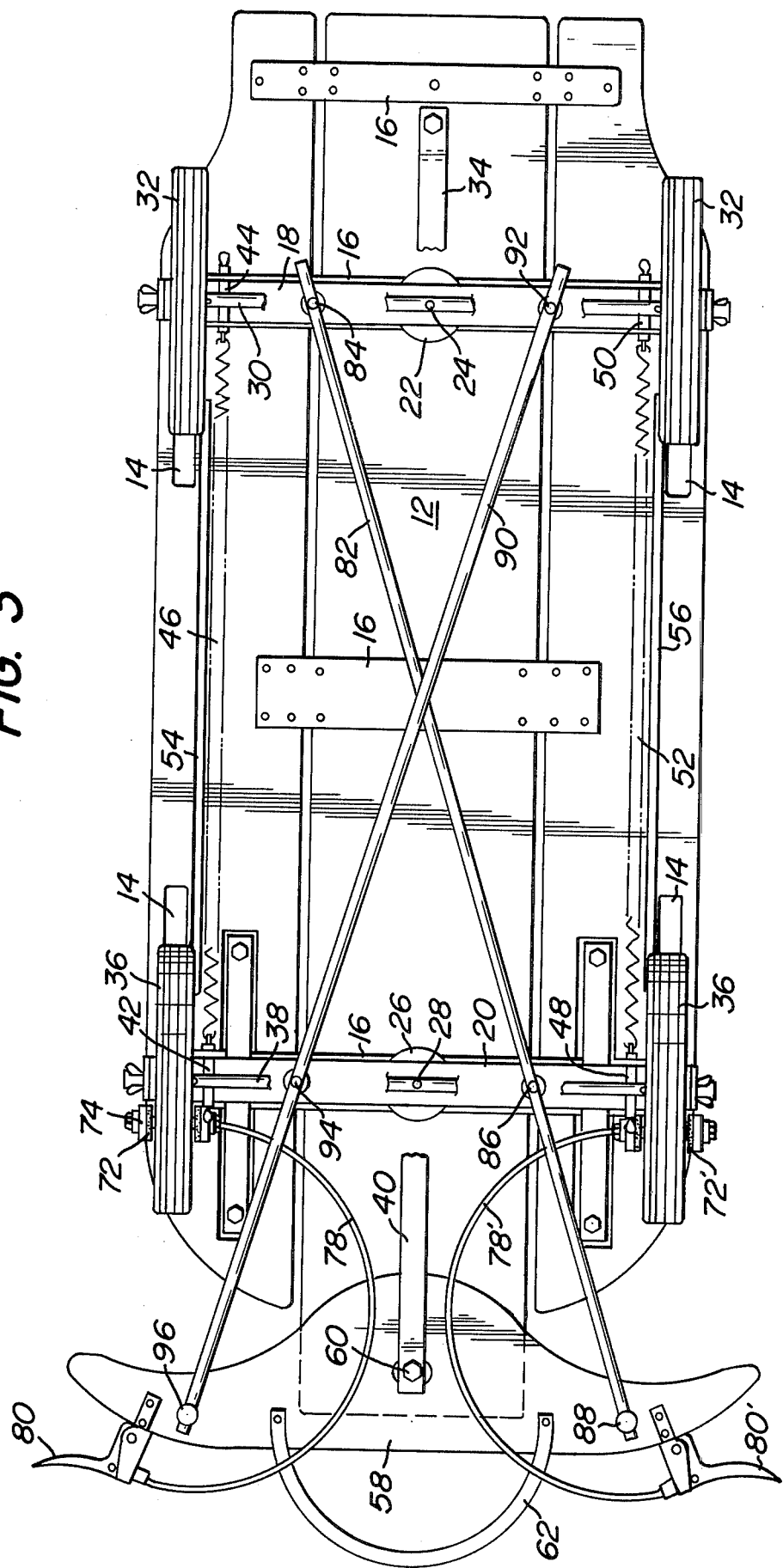
FIG. 3 is a bottom plan view of the sled shown in FIGS. 1 and 2.

The wheeled sled 10 includes a platform 12. As shown, the platform 12 is comprised of three slats preferably ¾ inch thick pine. Other materials and a greater or lesser number of slats may be used. The three slats are fixedly secured together by a plurality of transversely disposed braces 16. Four such braces 16 are illustrated in FIG. 3 but a greater or lesser number may be utilized. When using three slats for the platform 12, I prefer to make the outside slats approximately 5 inches wide with the center slat being slighter wider. The outside slats have longitudinally extending handle slots 14 to facilitate manipulation of the wheeled sled 10.

A rear axle brace 18 overlies one of the braces 16 as shown more clearly in FIG. 3. A front axle brace 20 overlies another one of the braces 16. The braces 20, 18 are preferably made from metal and are generally U-shaped with their bight portions being flat and having a length corresponding generally to the width of the sled 10.

The rear axle brace 18 overlies a wheel disc 22 and is pivotably connected to the platform 12 by way of a pin 24. The front axle 20 overlies a wheel disc 26 and is pivotably connected to the platform 12 by way of pin 28. A rear axle 30 is rotatably supported by the downwardly extending legs of the axle brace 18. Rear wheels 32 are rotatably supported by the axle 30 between the downwardly extending legs of the axle brace 18. Brace 34 has one end fixed to the bottom of platform 12 and its other end pivoted to axle 30. The front axle brace 20 is similarly provided with an axle 38 rotatably supporting front wheels 36. The wheels 32, 36 are provided with solid rubber tires having a substantial width such as 1¾ inches wide.

An expansion screw or equivalent device 42 is threadedly coupled to the front axle brace 20 adjacent one end thereof. See FIG. 3. A similar screw 44 is threadedly coupled to the rear axle brace 18 adjacent one end thereof. A coil spring 46 is coupled by way of a hook to each of the screws 42, 44 and extends longitudinally along the sled 10. The coil spring 46 has a sufficient length so as to be in a neutral state, that is neither compressed nor expanded, when the axle braces 16, 18 are parallel to one another.

A second coil spring 52 extends longitudinally along the sled 10 on the opposite side thereof from the spring 46. Spring 52 is similarly connected to the axle braces 20, 18 by way of the expansion screws 48, 50, respectively. A downwardly extending wall 54 provides a shield for the spring 46 to prevent inadvertent contact therewith by one's fingers when using sled 10. A similar wall 56 provides a shield for the spring 52.

A steering handle 58 is pivotably connected to the front end of the platform 12 by way of a bolt 60. A brace 40 has one end connected to platform 12 by said bolt 60 and its other end pivoted to axle 38 by pin 43. A curved bumper 62 is supported at its ends by the steering handle 58. The steering handle 58 is located at an elevation immediately below the elevation of the platform 12 and has tapered ends so that they may be gripped by the hands of someone lying on the platform 12 or may be engaged by the feet of someone sitting on the platform 12. A friction brake 64 is provided for the front wheel 36 on one side of the sled and a similar brake 66 is provided for the other wheel 36 on the opposite side of the sled. The brakes are identical. Hence, only brake 64 will be described in detail with corresponding elements on brake 66 being identified by corresponding primed numerals.

The brake 64 includes a brake pad 68 on a support member 70 and a brake pad 72 on a support member 74. The members 70, 74 have relative pivotable movement about the pin 76. An actuating cable 78 extends from the members 70, 74 to a handle grip 80 supported by a steering handle 58 adjacent one end thereof. When the handle grip 80 is squeezed toward the steering handle 58 by one's fingers, the brake pads 68, 72 engage opposite side faces of the front wheel 36 and applying a brake action thereto. Handle grip 80 is spring biased to a nonbraking position. Per se, the brake 64 is not novel and in all material respects is similar to brakes used on bicycles. Hence, a more detailed description of the brake is not deemed necessary.

A steering rod 82 has one end pivotably secured to the rear axle brace 18 by pin 84, an intermediate portion is pivotably connected to the front axle brace 16 by pin 86, and the other end is pivotably connected to an end portion of handle 58 by pin 88. See FIG. 3 wherein the steering rod 82 is diagonally arranged with respect to the sled 10. A similar rod 90 has one end pivotably connected to the rear axle brace 18 by pin 92, an intermediate portion pivotably connected to the front axle brace 20 by way of pin 94, and has its other end pivotably connected to an end portion of the steering handle 58 by pin 96.

As shown in FIGS. 2 and 3, the steering rods 82, 90 are crossed and at elevations above the elevation of the wheels 32, 36 so as to be adjacent the lower surface of the platform 12. The word "rod" in this sense is not intended to define the shape in cross section. That is, rods 82, 90 may be cylindrical rods, rectangular bars, hollow tubes, channel shaped, etc. Since the steering rods 82, 90 cross each other adjacent the center of the sled 10, the rods directly pivot the front and rear axle braces in opposite directions in response to turning movement applied to the steering handle 58 to minimize the turning circle with direct positive control. Referring to FIG. 3, if handle 58 is pivoted clockwise about pin 60, axle brace 20 is likewise pivoted clockwise while the rear axle brace 18 is pivoted counterclockwise with the extent of pivotable movement being the same.

The sled 10 may be manually gripped by the handle slots 14 and used on pavements in the same manner as a conventional sled is used on snow. Thus, the handle slots 14 facilitate manipulating the sled 10 while attaining a running start. The user may lie prone on the platform 12 and manipulate the steering handle 58 by way of the person's hands. Alternatively, the sled 10 may be used with the person sitting upright on the platform 12. In that event, the handle slots 14 facilitate holding onto the sled while the steering handle 58 is manipulated by the person's feet. The sitting position is not preferred since it does not facilitate access to the handle grips 80, 80' to facilitate application of the brakes.

In the above description wherein handle 58 in FIG. 3 was rotated clockwise, spring 46 was compressed and spring 52 was expanded. When turning pressure is released, handle 58 is returned to a neutral position by expansion of spring 46 and contraction of spring 52. The action of returning the steering handle 58 to its neutral position automatically returns the rear axle 18 and front axle 20 to their neutral position wherein they are parallel to one another. As a result thereof, the steering handle 58 may be manipulated in a counterclockwise direction in FIG. 3 immediately after having been rotated clockwise so as to make two sharp turns in opposite directions.

A wide variety of details of a conventional nature such as lock washers, bearings, and the like are provided on the sled wherever desired and/or appropriate. In view of their conventional nature, no further details are deemed necessary in connection with this disclosure.

The present invention may be embodied in other specific forms without departing from the spirit or essential attributes thereof and, accordingly, reference should be made to the appended claims, rather than to the foregoing specification as indicating the scope of the invention.

I claim:

1. A wheeled sled comprising a generally flat platform having a front end and a rear end, front and rear axle braces, said rear axle brace being pivotably connected to a bottom of the platform adjacent the rear end about a vertical pivot, said front axle brace being pivotably connected to a bottom of said platform adjacent the front end about a vertical pivot, an axle supported by each axle brace, a pair of wheels on each axle, a steering handle pivotably supported by said platform adjacent the front end thereof about a vertical pivot spaced longitudinally from said axle brace pivots, crossed steering bars, each steering bar being pivotably coupled to each of the axle braces and to said steering handle.

2. A wheeled sled in accordance with claim 1 including friction brakes supported adjacent each of the front wheels, an actuator for each of the brakes supported on the steering handle adjacent an end thereof.

3. A wheeled sled in accordance with claim 1 including a pair of longitudinally extending springs, each spring being adjacent one side of the platform, each spring being coupled an end portion of each of the front and rear axle braces, said springs being in a neutral state when the axle braces are parallel to one another and transverse with respect to the platform.

4. A wheeled sled in accordance with claim 1 wherein said axle braces including a bight portion and downwardly extending legs, the bight portion of each axle brace being pivotably connected to the platform adjacent a center portion of the bight portions.

5. A wheeled sled in accordance with claim 1 wherein the steering bars being pivotably connected to the bight portions of the axle braces on opposite sides of their pivot.

6. A wheeled sled in accordance with claim 1 wherein a line extending between the pivotable couplings wherein the steering rods are connected to the steering handle is forwardly of the pivot point between said steering handle and said platform.

7. A wheeled sled in accordance with claim 1 including at least one longitudinally extending slot on opposite side edges of said platform.

8. A wheeled sled in accordance with claim 1 wherein said steering bars cross one another adjacent a central portion of the platform, said steering bars being at an elevation below the elevation of said steering handle and above the elevation of said wheels.

9. A wheeled sled in accordance with claim 1 including a curved bumper having its ends secured to the steering handle, said bumper projecting forwardly of the steering handle.

10. A wheeled sled comprising a generally flat platform having a front end and a rear end, front and rear wheel assemblies, said rear wheel assembly being pivotably connected to a bottom of the platform adjacent the rear end about a vertical pivot, said front wheel assembly being pivotably connected to a bottom of said platform adjacent the front end about a vertical pivot, a steering handle pivotably supported by said platform adjacent the front end thereof about a vertical pivot spaced longitudinally from said axle brace pivots, steering bars each generally diagonally arranged beneath the platform and which cross one another adjacent a central portion of the platform, each steering bar being pivotably coupled to each of the wheel assemblies and to said steering handle, a pair of longitudinally extending springs, each spring being adjacent one side of the platform, each spring being coupled to an end portion of each of the front and rear wheel assemblies, said springs biasing said assemblies to neutral state, and a guard for each spring.

* * * * *